United States Patent [19]

Brock et al.

[11] Patent Number: 4,480,282

[45] Date of Patent: Oct. 30, 1984

[54] STABILIZED LOCATING RING FOR A FLEXIBLE DISK

[75] Inventors: George W. Brock, Los Altos Hills; Alfred W. Conner, Palo Alto, both of Calif.

[73] Assignee: Verbatim Corporation, Sunnyvale, Calif.

[21] Appl. No.: 350,817

[22] Filed: Feb. 22, 1982

[51] Int. Cl.³ .................. G11B 5/016; G11B 5/82; G11B 3/70; G11B 5/84

[52] U.S. Cl. ............................ 360/135; 360/99; 369/290

[58] Field of Search ............... 360/135, 133, 137, 99; 369/280, 282, 283, 289, 290

[56] References Cited

U.S. PATENT DOCUMENTS

| | | | |
|---|---|---|---|
| 3,729,720 | 4/1973 | Darling | 360/99 |
| 3,951,264 | 4/1976 | Heidecker | 360/99 |
| 4,052,750 | 10/1977 | Barber | 360/135 |
| 4,370,689 | 1/1983 | Davies | 360/135 |
| 4,376,963 | 3/1983 | Knoop | 360/135 |

Primary Examiner—Robert M. Kilgore
Attorney, Agent, or Firm—Thomas E. Schatzel

[57] ABSTRACT

An improved magnetic flexible disk for use in data storage is provided with a stabilized locating ring about the spindle aperture thereof. The stabilized locating ring is selected from an electrically conductive material having miniscule humidital expansion characteristics at normal use temperatures. The stabilized locating ring has an inside diameter precisely equal to the outside diameter of the drive spindle on the disk drive apparatus for which the disk is designed to be utilized. The locating ring is bonded onto an existing disk which has had its central aperture punched to be slightly oversized. The improved disk is characterized by its longer usable lifetime, substantially elimination of errors in registration and increased data capacity.

10 Claims, 2 Drawing Figures

U.S. Patent     Oct. 30, 1984     4,480,282
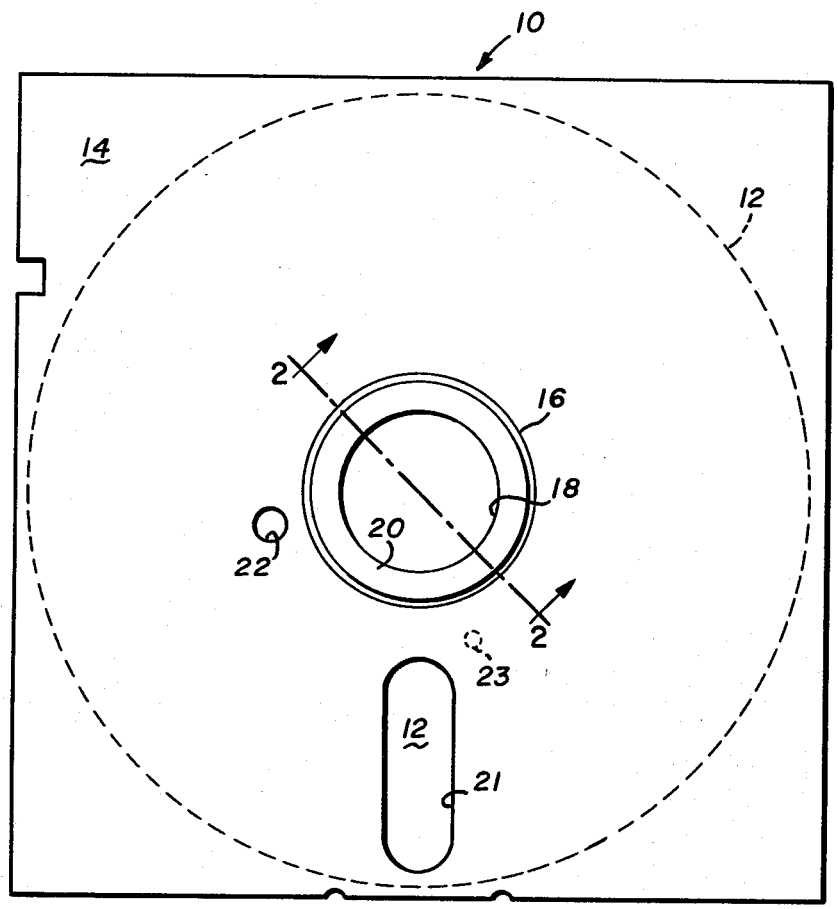
Fig_1
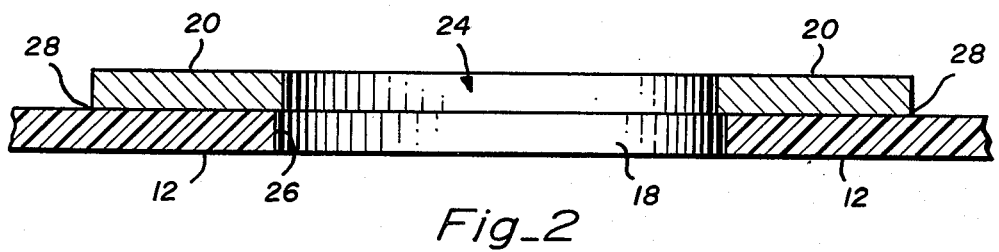
Fig_2

STABILIZED LOCATING RING FOR A FLEXIBLE DISK

BACKGROUND OF THE INVENTION

1. Field of the Invention

The present invention relates generally to magnetic storage media and more particularly to flexible magnetic disks for use in data storage.

2. Background Art

With the development of micro-miniature circuitry the availability of computer techniques for applications of all types has greatly increased the need for usable data storage capability. Magnetic media have been the primary means of storing data for computer and data processing usages. Of the magnetic storage media, one of the most popular types is the flexible diskette.

Flexible diskettes are recording disks of a flexible material such as polyethylene teraphthalate ("PET"). One or both surfaces of the disk is coated with a material including magnetic particles, usually of gamma-ferric oxide ($\gamma Fe_2O_3$). The disk has a central hole for fitting upon a spindle in the disk drive mechanism. The entire disk is enclosed in an envelope which has apertures therethrough for receiving the spindle, for indexing, and for receiving the read/write head which transfers information to and from the magnetic medium.

Flexible diskettes are commonly used in commerce and have been the subject of numerous previous patents and applications. Among the U.S. patents dealing with flexible diskettes are U.S. Pat. No. 3,951,264, issued to Heidecker, et al., U.S. Pat. No. 4,152,740, issued to Stratton, U.S. Pat. No. 4,216,511, issued to Bilek, and U.S. Pat. No. 4,052,750, issued to Barber, et al.

One of the primary difficulties encountered in the use of flexible diskettes is the difficulty in centering the magnetic disk precisely on the spindle of the disk drive. Centering is of extreme importance because it is necessary that the same data be at exactly the same position with respect to the read/write head and the index point each time the disk is placed upon the spindle. If the disk is not precisely centered, the indexing for the read/write head will not operate properly. Variations in the centering of the disk may also make it necessary for the read/write head to scan a wider area, or track, to find the desired information. This limits the number of tracks which can be placed on a given disk.

Various prior art attempts have dealt with strengthening the spindle aperture of the magnetic disk. This has frequently been useful for extending the life of the disk. These devices have typically been in the form of flexible reinforcement rings placed around the spindle aperture in order to prevent the use of the spindle from damaging the aperture and thus rendering the disk unusable. Examples of aperture reinforcement devices are found in the Barber et al. patent, the Bilek patent, the Stratton patent and the Fortifier TM marketed by Inmac Corporation of Santa Clara, Calif.

However, none of the reinforcement devices for use with flexible diskettes address the specific problem of precise centering of the disk on the spindle and maintaining that degree of centering over the life of the disk. Presently utilized flexible disks, even those with reinforcing rings, have a tendency to get out of center. This reduces their useful life and limits the amount of data that can be stored thereon.

Centering problems have been very difficult to eliminate in flexible disks due to the physical properties of the disk material. The PET material prevalently used for flexible disks is characterized by poor punching ability in that precise aperture punching is difficult to achieve. The PET material also exhibits anisotropic expansion characteristics in response to environmental changes. The asymmetric expansion of the PET in response to changes in humidity and temperature are particularly manifested in the vicinity of the spindle aperture since the material is subjected to physical stresses in that vicinity.

Furthermore, many prior art disks, especially those with insulating reinforcing members, may have problems with static electricity build-up on the disk medium.

DISCLOSURE OF INVENTION

Accordingly, it is an object of the present invention to provide an improved flexible diskette wherein the disk is precisely centered upon the spindle each time the disk is utilized throughout the lifetime of the disk. It is another object of the present invention to provide a disk including a stabilized locating ring which prevents an operator or machine from miscentering the disk on the spindle.

It is a further object of the present invention to dissociate the punched aperture in the disk material from contact with the spindle and thus eliminate the affect of punching defects and anisotropic expansion of the disk material on the centering of the disk.

Briefly, the preferred embodiment of the present invention is a flexible disk including a stabilized locating ring about the spindle aperture of the disk. The locating ring is of a physically strong non-malleable, material precisely shaped to have an inside diameter very slightly greater than the outside diameter of the spindle. The locating ring is positioned on the disk such that the locating ring is the only portion of the improved disk which contacts the spindle, the spindle does not engage any portion of the PET disk material. The locating ring is bonded to the disk material by a stable adhesive that will not run or spread to the interior surface of the locating ring and thus foul the spindle.

It is an advantage of the present invention that the stabilized locating ring provides that the disk may be precisely centered upon the spindle such that errors in reading or writing on the disk caused by mispositioning of the head are substantially eliminated.

It is yet another advantage of the present invention that the precise centering of the disk caused by the stabilized locating ring allows the use of read/write heads capable of using narrower tracks on the disk, and thus permits an increase in the number of tracks and total amount of data storage on a given disk.

It is yet another advantage of the present invention that the material of the locating ring could be conductive and thus permit the conduction of static charges to the spindle and thus help prevent the detrimental build-up of static charges in the magnetic medium.

These and other objects and advantages of the present invention will no doubt become clear to one skilled in the art upon reading the description of the best mode for carrying out the invention as the best mode is illustrated in the several figures of the drawing.

BRIEF DESCRIPTION OF DRAWINGS

FIG. 1 is a top plan view of a flexible diskette, showing the outline of the enclosed flexible disk in phantom; and FIG. 2 is a cross sectional view taken along line 2—2 of FIG. 1, illustrating the disk material and the stabilized locating ring.

BEST MODE FOR CARRYING OUT INVENTION

The present invention is an improvement in a flexible disk for use in magnetic data storage. The typical disk, provided with the improvement of the present invention, is illustrated in FIG. 1.

One of the most popular forms of magnetic medium available on the market is the flexible diskette illustrated in FIG. 1 and designated by the general reference character 10. The flexible diskette includes a circular thin disk 12, shown in phantom, contained in a jacket 14. The disk 12 is commonly made of a PET film base with the exterior annular portions of the disk coated with a material including a magnetic medium capable of storing magnetic information, typically $\gamma$-$Fe_2O_3$ in a single-domain form.

The jacket 14 is typically a polyethylene or polycarbonate material, usually provided with an interior liner for contacting the surface of the diskette. The jacket and liner are designed to hold the disk in a proper orientation and further to protect the surface of the magnetic medium during use and storage.

When the flexible diskette 10 is used, the diskette 10 is placed into a disk drive apparatus. The disk drive apparatus includes a spindle mounted on a hub. The spindle and hub engage the diskette at a jacket hub aperture 16 and a disk spindle aperture 18. The disk spindle aperture 18 is located at the center of the disk 12 while the larger jacket hub aperture 16 is located near the center of the jacket such that the spindle aperture 18 is approximately centered in the hub aperture 16.

The improvement of the present invention is the addition of a stabilized, locator ring 20 bonded to the disk 12 and providing the spindle aperture 18.

Once the spindle has engaged the disk 12 at the spindle aperture 18, the disk drive is operational and the read/write head for transmitting or receiving information from the disk 12 engages the diskette 10 in the vicinity of a read/write aperture 21 in jacket 14. The read/write aperture 21 provides access to the magnetic medium such that data may be recorded thereon or retrieved therefrom. The jacket 14 is formed to include a jacket index aperture 22 and the disk 12 is formed to include a disk index aperture 23. These apertures provide index points for rotationally locating the disk in relation to the read/write aperture 21. A photoelectric or other sensing mechanism provides a signal when the disk index aperture 23 is aligned with the jacket index aperture 22. Rotational positions on the concentric data tracks on the disk are then measured in degrees of rotation from index.

FIG. 2 illustrates, in partial cross-section, the disk 12 of FIG. 1 and the locator ring 20. In this illustration the interior of the locating ring 20 is provided with a ring aperture 24 which is equivalent to the spindle aperture 18 encountered by the spindle. The disk 12 is provided with a disk aperture 26 which has a diameter slightly greater than that of the ring aperture 24. The locating ring 20 is positioned on disk 12 such that the entire ring aperture 24 is situated interiorily to the disk aperture 26 as regards the axis of the spindle. This alignment provides that the PET disk material does not contact the spindle during operation.

The locating ring 20 is bonded to the disk 12 by an adhesive 28. The adhesive used for affixing the locating ring 20 to the disk 12 must not be extruded by the contact pressure to flow between the ring 20 and the spindle. The adhesive must remain in position or it will foul the contact between the spindle and the ring aperture 24 and hamper the operation of the diskette 10. Therefore, the adhesive should be selected to be one which hardens quickly and requires only a light squeeze force to set the bond. It is also important that the adhesive should not flow between the adjacent faces of the ring 20 and the disk 12 and should be amenable to being applied at normal temperatures, since any heating may cause a relative temperature differential between the ring 20 and the disk 12 and may result in buckling or modulation of the disk body. The preferred adhesive is No. 3M77 contact adhesive manufactured by the Minnesota Mining and Manufacturing Company.

The locating ring 20 is preferentially manufactured of a non-malleable metallic material such as stainless steel or beryllium-copper (BeCu). The ring material is selected to have a isotropic coefficient of expansion dependent on either temperature or humidity. The ring material could be electrically conductive to inhibit the build-up of static charges on the disk 12 by facilitating the transfer of static charges to the spindle. The interior diameter of the locating ring 20 is selected to precisely match the outside diameter of the spindle such that a precise fit is accomplished and the margin for error in centering is minimized. In the preferred embodiment, the locating ring 20 is selected to be a stainless steel ring having a thickness of 0.0127 cm. (0.005 in.), an inside diameter of 2.8575 cm. (1.125 in.) and an outside diameter of 3.9425 cm. (1.375 in.). However the inside and outside diameters are shown to match the particular size of drive in which the disk is used.

In the preferred embodiment the disk 12 is punched in such a manner that the disk aperture 26 is oversize from the normal aperture of a magnetic disk. In the normal manufacturing process of prior art disks, the disk aperture 26 is selected to engage the spindle. However, with the improvement of the present invention, the entire engagement of the spindle occurs at the ring aperture 24. Since the coefficients of expansion of the PET disk material and the metallic ring material are not equal, it is desirable to have the PET material recessed from the ring aperture 24 such that thermal or humidital expansion of the PET material of the disk 12 does not cause interference with the precise aperture formed by the locating ring 20.

Various other materials may be utilized for the locating ring 20, the adhesive 28 and the disk material 12. The dimensions and characteristics of the elements may also be altered to accommodate specific applications. Also there are various means of fastening the ring to the disk, including welding, diffusion bonding, thermal bonding, ultrasonic bonding, riveting, or stapling.

Although the present invention has been described above in terms of the preferred embodiment or best mode, it is to be understood that such disclosure is not to be considered as limiting. Various modifications, alterations and other applications of the invention will become clear to those skilled in the art. Accordingly, it is intended that the claims be interpreted as encompassing the full scope and spirit of the invention.

INDUSTRIAL APPLICBILITY

The improvement to the flexible disk embodied by the stabilized locating ring 20 of the present invention is applicable to most high technology flexible disks in current use. The stabilized locating ring 20 is simple in design and easy to manufacture. It is also a relatively simple matter to install the ring 20 upon a disk 12 in which the central aperture 26 has been slightly overpunched. Thus, it is possible to adapt the present improvement to the flexible disks presently manufactured.

The adoption of the improvement of the stabilized locating ring 20 will greatly increase the utility of the magnetic disk 12. Since the disk 12 will always be precisely centered on the disk drive spindle, the same location in the magnetic medium will always be at the same place with respect to the read/write head and the index each time the disk is installed on the spindle. Furthermore, since the disk is always accurately centered, the read/write head need not be set to allow for a significant margin of error in the radial registration of the particular data track on the disk.

Consequently, it is feasible to use narrower data tracks and to thus record a greater number of tracks and a greater amount of data on any given disk. In this manner, the improvement of the stabilized locating ring 20 may be used to increase the capacity of disks 12 otherwise identical to those of the prior art.

The stabilized locating ring 20 could be of a conductive nature and provide an electrical pathway for the discharge of static build up in the magnetic medium on the disk to the spindle. By facilitating this discharge, the locating ring is useful in helping to prevent harmful discharges from the disk material to the read/write head and further to minimize static frictional inhibition of the rotation of the disk 12 within the jacket 14.

Although not one of its primary objects, the stabilized locating ring 12 also operates to reinforce the disk 12 in the vicinity of the spindle aperture 18. This reinforcement is similar to that provided by that prior reinforcement rings and results in a significant extension of the useful life of the disk.

Other objects, advantages and uses of the improved magnetic disk, including a stabilized locator ring, will become obvious to those skilled in the art as the invention is utilized.

We claim:

1. In a flexible disk including a thin film disk base substrate material coated with at least one layer of a magnetic recording material and including a central aperture therethrough for receiving a disk drive spindle, the improvement comprising:
a stablilized locating ring mounted concentrically about said central aperture on one disk surface, the ring being formed of a non-malleable material having isotropic thermal and humidital expansion characteristics, and having a thickness which is similar to a thickness of said base substrate material, the ring further having an inside diameter which is slightly smaller than said disk central aperture diameter and an outside diameter which is less than the radial distance from a central axis of the disk to a disk index aperture, whereby the interior aperture of the locating ring engages the spindle for a precise fit.

2. The improved flexible disk of claim 1 wherein the locating ring is electrically conductive.

3. The improved flexible disk of claim 1 wherein the locating ring is constructed of stainless steel preferably.

4. The improved flexible disk of claim 1 wherein the locating ring is bonded to the disk material by a permanent, non-flowable adhesive.

5. The improved flexible disk of claim 4 wherein said adhesive is selected to be Number 3M77 contact adhesive.

6. An improved flexible disk for the storage of magnetic data comprising:
a thin film flexible disk base substrate material coated with at least one magnetic recording layer and formed to include a central circular aperture; and
a stabilized locating ring mounted on at least one surface of a disk concentrically with said central circular aperture, the ring being formed of a material having isotropic thermal and humidital expansion characteristics and being bonded to the disk surface by a permanent, non-flowable adhesive, the ring having a thickness similar to a thickness of the base substrate material, the ring further having an inside diameter which is slightly smaller than said central circular aperture and an outside diameter which is less than the radial distance from a central axis of the disk to the nearer of either a disk index aperture or a read/write aperture wherein the inside surface of the locating ring can engage the spindle on a disk drive apparatus in a precise fit when the improved flexible disk is used.

7. The improved flexible disk of claim 6 wherein the locating ring is comprised of a non-malleable material.

8. The improved flexible disk of claim 7 wherein the locating ring is comprised of stainless steel.

9. The improved flexible disk of claim 7 wherein the locating ring material is electrically conductive whereby static charge buildup on the disk may be dissipated therethrough.

10. The improved flexible disk of claim 6 wherein said adhesive is selected to be a non-flowable, cold bonding adhesive which hardens rapidly and requires only a light pressure on the disk and ring to set a bond.

* * * * *